United States Patent [19]

Goruganthu et al.

[11] Patent Number: 5,272,309

[45] Date of Patent: Dec. 21, 1993

[54] BONDING METAL MEMBERS WITH MULTIPLE LASER BEAMS

[75] Inventors: Rama R. Goruganthu, Austin; Philip J. Spletter, Cedar Park, both of Tex.

[73] Assignee: Microelectronics and Computer Technology Corporation, Austin, Tex.

[21] Appl. No.: 822,273

[22] Filed: Jan. 17, 1992

Related U.S. Application Data

[63] Continuation-in-part of Ser. No. 561,555, Aug. 1, 1990, Pat. No. 5,083,007.

[51] Int. Cl.⁵ .................................................. B23K 26/00
[52] U.S. Cl. ............................ 219/121.63; 219/121.64; 219/121.76; 219/121.77
[58] Field of Search .................. 219/121.76, 121.77, 219/121.74, 121.68, 121.69, 121.63, 121.64, 121.65, 121.66

[56] References Cited

U.S. PATENT DOCUMENTS

4,879,449  11/1989  Duley et al. ............... 219/121.76 X
5,168,454  12/1992  LaPlante et al. ............... 364/474.08

OTHER PUBLICATIONS

"Europeans Focus On Copper Vapor Lasers," *Photonics Spectra*, Jan. 1992, p. 71.

*Primary Examiner*—C. L. Albritton
*Attorney, Agent, or Firm*—David M. Sigmond

[57] ABSTRACT

A first laser beam and a second laser beam with a longer wavelength than the first laser beam are directed at a first metal member in contact with a second metal member. At the ambient temperature the first member has high absorption of energy from the first laser beam but low absorption of energy from the second laser beam. As the first member absorbs energy from the first laser beam the temperature of the first member increases and the reflectivity of the first member decreases so that the first member has high absorption of energy from the second laser beam. The first member then absorbs energy from the second laser beam, the temperature of the first member further increases and at least one of the members melts. After discontinuing the laser beams a solid bond forms between the members.

51 Claims, 9 Drawing Sheets

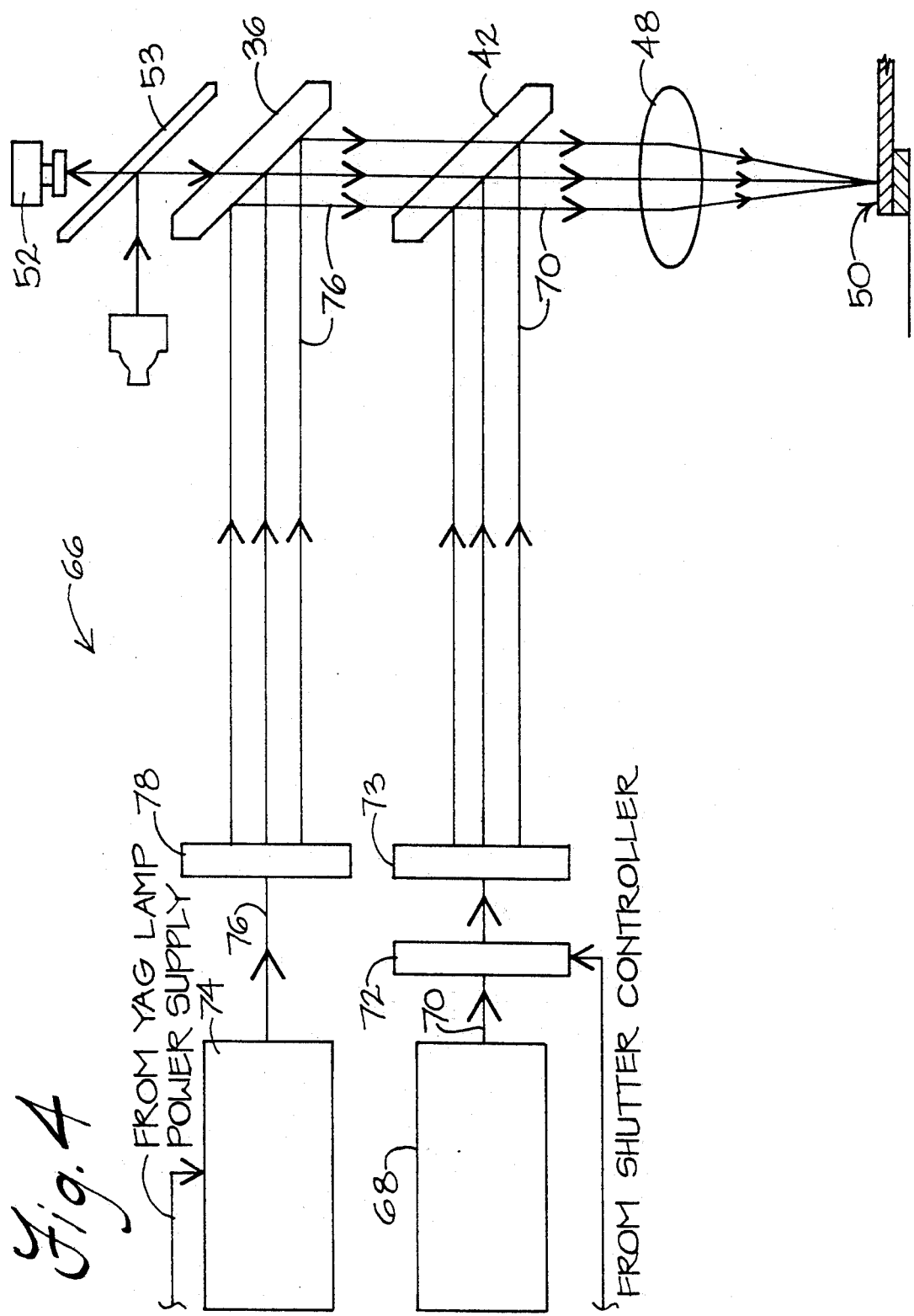

BONDING METAL MEMBERS WITH MULTIPLE LASER BEAMS

CROSS-REFERENCE TO RELATED APPLICATIONS

This is a continuation-in-part of U.S. application Ser. No. 07/561,555, filed Aug. 1, 1990 U.S. Pat. No. 5,083,007.

BACKGROUND OF THE INVENTION

1. Field of the Invention

The present invention is generally directed to using multiple laser beams to heat, melt and bond metal members, and more particularly to laser bonding a metal member which has high absorption of energy from a first laser beam at the ambient temperature and high absorption of energy from a second laser beam after being heated by the first laser beam.

2. Description of Related Art

Lasers used in microelectronic bonding provide concentrated localized heating. This is especially useful for soldering or welding bonds on electrical interconnects such as customizable copper/polyimide substrates with fine pitch dimensions, low thermal stress tolerance or heat sensitive components.

Yttrium-aluminum-garnet (YAG) crystal doped with neodymium (Nd) can produce a laser beam with a fundamental wavelength of about 1064 nanometer (nm) wavelength which is infrared radiation and invisible to the human eye. Nd:YAG lasers provide a desirable balance between maximizing the energy absorption of metals and minimizing the energy absorption of polymer substrates. Nd:YAG laser outputs can be continuous-wave, shuttered with an acousto-optic or electro-optic device (Q-switch), or pulsed. While these outputs are each at 1064 nm wavelength, the peak output powers differ widely and these differences can have a profound effect on the suitability of any Nd:YAG laser for a particular application. Most currently available frequency doubled Nd:YAG lasers are either Q-switched or continuous-wave and as such are not suitable for microelectronic bonding. Continuous-wave frequency doubled Nd:YAG lasers produce an energy flux that is difficult to control and tend to thermally shock and damage a bond site. Q-switched frequency doubled Nd:YAG lasers produce extremely high peak power for short pulse widths, e.g. kilowatts for nanoseconds, and as such drill or cut through the electical members instead of bonding them by welding or solder reflow.

The use of 1064 nm wavelength Nd:YAG lasers for bonding electrical members of microelectronic components is well known in the art. A few related patents are as follows:

U.S. Pat. No. 4,697,061 to Spater et al. describes welding a metallic base to a thin, metallic covering which is highly reflective to the laser but covered with a metal skin which noticeably absorbs the laser.

U.S. Pat. No. 4,845,355 to Andrews et al. describes using a pulsed YAG laser to bond a bump on an integrated circuit to a tape-automated-bonding lead with a coating that has the property of being well coupled to the wavelength of the laser and which has a lower melting point than the melting point of the lead or bump.

U.S. Pat. No. 5,008,512 to Spletter et al. describes coating a coupling material on an electrical member and selecting the laser characteristics so that as bonding occurs an alloy of the electrical members solidifies and a solidification front drives the molten coating and molten compounds containing the coating away from the bond interface towards the exterior periphery of the bond. As a result, substantially all of the solidified bond interface consists of an alloy of the electrical members and substantially all of the bond interface strength results from the alloy of the electrical members.

U.S. Pat. No. 5,049,718 to Spletter et al. is similar to the '512 except that instead of coating the coupling material on an electrical member, the electrical member is coated with a coating alloy which comprises the coupling material and the same metal as the other electrical member.

Each of the foregoing patents describes bonding the metal members by using a single laser beam, usually a 1064 nm wavelength Nd:YAG. Frequency doubled pulsed Nd:YAG lasers create green light at 532 nm wavelength (sometimes rounded to 533 nm) which is visible to the human eye and often used for rangefinding, night vision, and heating large metal structures not found in microelectronic bonding. Commercial vendors include Lumonics Corp. and Kigre Corp.

Additional laser beams have been used in bonding operations for purposes other than supplying energy to heat the bond. For example, U.S. Pat. No. 4,845,354 to Gupta et al. describes a process control for laser wire bonding in which a low power laser beam which is co-linear with a high power laser beam is conducted to the bond site and reflected from the wire during the bonding cycle. The change in reflectivity of the wire is detected by the low power laser beam and a signal commensurate with the detected change of reflectivity is used to control the pow®r or duration of the high power laser beam during bonding.

Nevertheless, lasers at shorter wavelengths in the range of 300–600 nm, in particular the Nd:YAG frequency doubled 532 nm wavelength provides a substantial increase in the amount of laser energy absorbed by appropriate metal electrical members as they are heated and bonded, as pointed out by M. Greenstein in "Optical Absorption Aspects of Laser Soldering for High Density Interconnects," *Applied Optics*, Vol 28, No. 21, Nov. 1, 1989, pp. 4595–4603 which is incorporated herein by reference. The article reports that for both gold and copper metallurgies the 532 nm wavelenqth of a Nd:YAG laser provides significantly more absorption of laser energy than the 1064 nm wavelength. Furthermore, as the temperature of gold and copper increases the predicted optical absorption of gold and copper, respectively, increases as well. For example, when a frequency doubled pulsed Nd:YAG laser beam was directed at gold plated copper surfaces of tape-automated-bonding lead frames, 40% of the energy from the green component was absorbed versus about 1–5% of the energy from the infrared component.

Building on the work of Greenstein, a frequency doubled pulsed laser beam for bonding electrical members is described in U.S. application Ser. No. 07/561,555 by Spletter et al., filed Aug. 1, 1990, which is the parent of the instant application, assigned to the assignee of the present invention and incorporated herein by reference. The '555 also describes a method of adjusting the mix of base and frequency doubled wavelengths in the laser beam. Perhaps most importantly, the '555 provides for laser bonding highly reflective members such as gold and copper without any absorbent coupling material such as tin by using a frequency doubled pulsed Nd:YAG laser beam so that the 532 nm wavelength heats the metal members until their temperature increases, their reflectivity decreases and they become absorbent to the 1064 nm wavelength. The 1064 nm wavelength further heats and eventually melts the members so that a solid alloy bond is formed therebetween.

SUMMARY OF THE INVENTION

The present invention expands on the teachings of the forementioned '555 parent application by providing a wider range of laser beams that need not necessarily be in frequency doubled relationship.

In accordance with the teachings of the present invention, a first laser beam and a second laser beam with a longer wavelength than the first laser beam are directed at a first metal member in contact with a second metal member. At the ambient temperature the first member has high absorption of energy from the first laser beam but low absorption of energy from the second laser beam. As the first member absorbs energy from the first laser beam the temperature of the first member increases and the reflectivity of the first member decreases so that the first member has high absorption of energy from the second laser beam. The first member then absorbs energy from the second laser beam, the temperature of the first member further increases and at least one of the members melts. After discontinuing the laser beams a solid bond forms between the members.

Accordingly, an object of the present invention is the use of a wide variety of multiple laser beams to bond a wide variety of commonly used metals for the fabrication of microelectronic components.

Another object of the present invention is to laser bond highly reflective metal members without the need for a non-highly reflective coupling material to absorb energy from a laser beam. In one embodiment a gold plated copper tape-automated-bonding lead is laser bonded to a gold bonding pad on an integrated circuit chip without the need for tin or flux.

A further object of the present invention is to heat the first member above the ambient temperature solely by energy from the laser with essentially all the laser energy absorbed by the first or both members.

A feature of the present invention is wherein high absorption is defined as greater than or equal to 10 percent of the energy in the laser beam where the laser beam impinges upon the first member, and low absorption is defined as less than 10 percent of the energy in the laser beam where the laser beam impinges upon the first member.

Another feature of the present invention includes generating the first and second laser beams as a co-linear laser beam, separating the first and second laser beams from the co-linear laser beam, attenuating the separated first laser beam, attenuating the separated second laser beam, combining the attenuated first and second laser beams into a composition altered co-linear beam, and directing the composition altered co-linear laser beam at the first member so that the percentage of the first and second laser beams which impinge upon the first member is adjustable.

A further feature of the present invention is the use of multiple laser beams which are not co-linear and are not applied simultaneously to the metal members.

These and other objects, features and advantages of the present invention will be further described and more readily apparent from a review of the detailed description and preferred embodiments which follow.

BRIEF DESCRIPTION OF THE DRAWINGS

A better understanding of the present invention can be obtained when the following detailed description of the preferred embodiment is read in conjunction with the following drawings, in which:

FIGS. 4-7 are schematic representations for bonding metal members with multiple laser beams which are not applied simultaneously and are not in frequency doubled relationship;

DETAILED DESCRIPTION OF THE PREFERRED EMBODIMENTS

Figure 1:
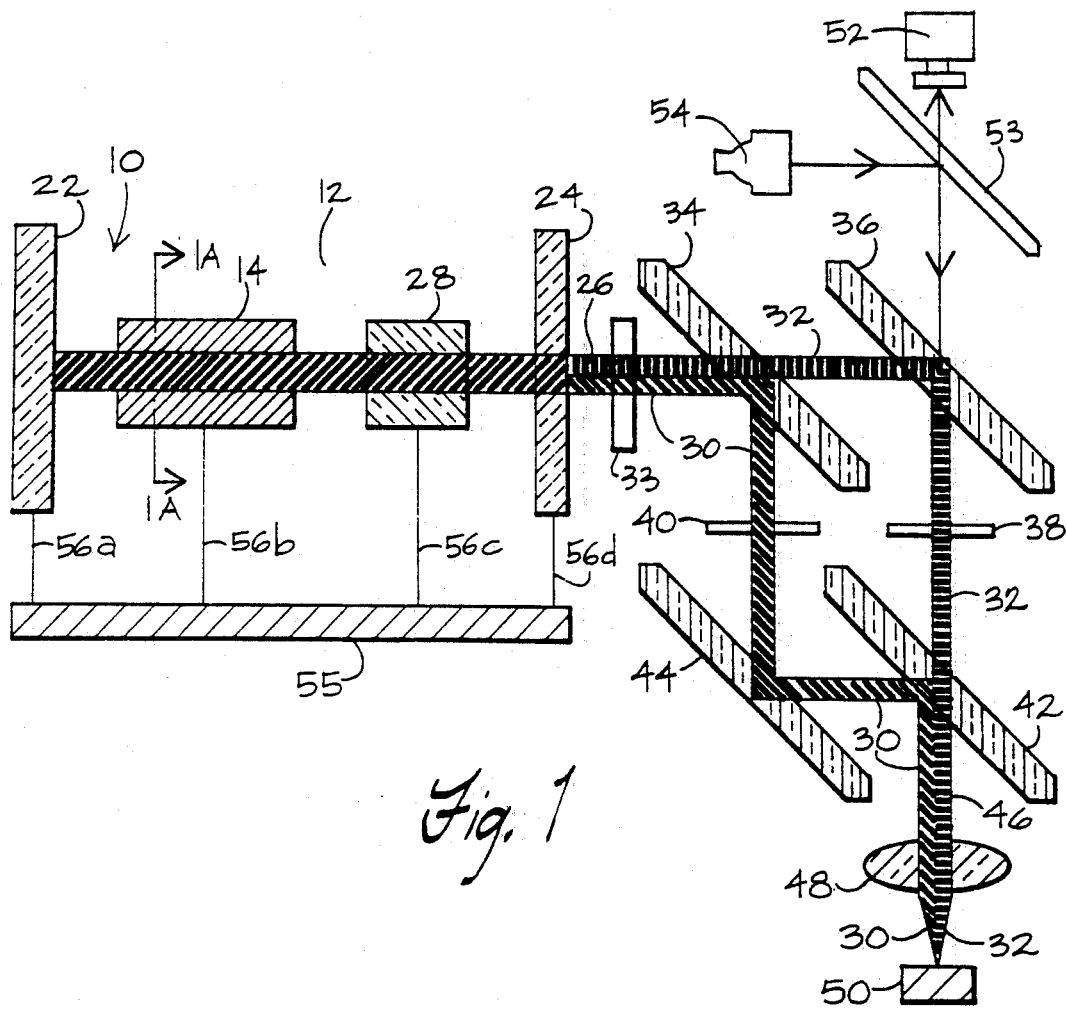
FIG. 1 is a partically schematic representation for bonding metal members with multiple laser beams which are applied simultaneously and in frequency doubled relationship.

As previously mentioned, U.S. application Ser. No. 07/555,561 by Spletter et al., filed Aug. 1, 1990, which is the parent of the present invention, describes bonding metal members by using multiple laser beams which are in frequency doubled relationship. The multiple laser beams in the present invention may be but are not limited to those in frequency doubled relationship.

Referring now to the drawings wherein depicted elements are not necessarily drawn to scale and wherein like or similar elements are designated by the same reference numeral through several views, several embodiments of the present invention are shown.

With reference now to FIGS. 1-1A, 2 and 3A-3D, in accordance with one embodiment of the present invention, first and second laser beams in frequency doubled relationship are simultaneously directed at the metal members.

Figure 1A:
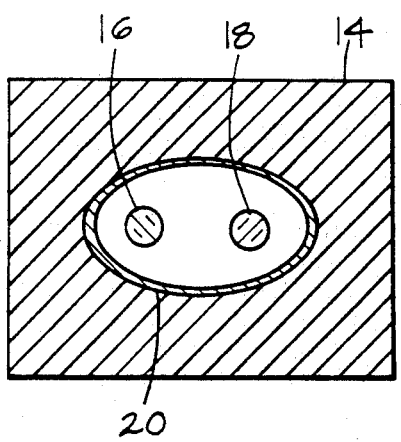
FIG. 1A is a cross-sectional view taken along line 1A—1A of FIG. 1 showing a housing containing a YAG rod and flashlamp.

Referring now to FIGS. 1 and 1A, a frequency doubled pulsed solid state Nd:YAG laser beam can be generated by various crystals such as yttrium-aluminum-garnet (YAG), yttrium-lithium-flouride (YLF), yttrium-aluminum-phosphide (YAP) and glass, each of which is doped with neodymium (Nd). Apparatus 10 contains a cavity 12 comprising elliptical housing 14, which as seen in FIG. 1A (taken across line 1A—1A in FIG. 1) contains YAG rod 16 and flashlamp 18 positioned adjacent to one another at the focii of the elliptical chamber inside housing 14. Inside wall 20 of housing 14 is covered with highly reflective gold. YAG rod 16 is pumped with one krypton flashlamp 18 to produce a laser beam in rod 16. YAG rod 16 is positioned and aligned between highly reflective reflector mirror 22 and output reflector mirror 24. Output mirror 24 is coated to pass a portion of the light therethough and out cavity 14. Suitable coatings for mirror 24 are conventional and known to those with skill in the art. Flashlamp 18 generates a 1064 nm wavelength pulsed Nd:YAG laser beam. Mirrors 22 and 24 are positioned to reflect the laser beam from rod 16 generated by flashlamp 18 back-and-forth in cavity 12 as well as allowing a portion of the radiation, such as 5–10%, to exit cavity 12 through output mirror 24 as laser beam 26.

Inserted into the laser beam path is a nonlinear potassium titanyl phosphate (KTP) crystal 28 for frequency doubling (second harmonic generation). Other suitable non-linear crystals include lithium iodate ($LiIO_3$), lithium niobate ($LiNbO_3$), and beta barium borate (BBO). Crystal 28 may be placed either inside or outside the laser cavity 12, referred to as "intracavity" or "extracavity" doubling, respectively. Intracavity frequency doubling produces the most green light because the electric field of the laser is most strong inside the cavity, especially with a multimode laser, and crystal 28 will produce the maximum green light when high power densities are impinged thereon. For this reason an intracavity crystal 28 is shown herein and preferred. It should be noted however that intracavity crystals are more prone to damage from high power densities than extracavity crystals. To overcome this difficulty, as opposed to conventional intracavity frequency doubled lasers, the present invention does not excite the crystal with extremely high power levels in an attempt to generate a high level of green light. Instead, a low power 1064 nm wavelength is used, for instance 100 millijoules. Thus, cavity 12 generates laser beam 26 which comprises in co-linear relationship a 532 nm wavelength first laser beam 30 and a 1064 nm wavelength second laser beam 32. The 532 nm beam 30 provides a small percentage (5–15%) of the total energy in beam 26.

Apparatus 10 also provides adjustment of the percentage of the 532 nm and 1064 nm beams that impinge upon a workpiece. After passing through shutter 33, laser beam 26 strikes first dichroic mirror 34 which splits or decombines 532 nm beam 30 from 1064 nm beam 32 by reflecting predominantly 1064 nm beam 32. The 532 nm beam 30 passes through mirror 34 and green light attenuator 36 before striking partially reflecting mirror 38, which reflects 532 nm beam 30 toward second dichroic mirror 40. Second dichroic mirror 40, like first dichroic mirror 34, does not affect 532 nm beam 30. Likewise, infrared attenuator 42 is placed in the path of 1064 nm beam 32. Attenuators 36 and 42 are adjusted to filter or reduce the desired amounts of beams 30 and 32, respectively. For example, a stack of neutral density filters may be used so that the number of filters in the stack determines the amount of attenuation. After passing through attenuator 42, 1064 nm beam 32 strikes another reflector mirror 44 and is directed toward second dichroic mirror 40. Upon striking second dichroic mirror 40, 1064 nm beam 32 is reflected so as to combine the attenuated beams 30 and 32 into a composition altered, co-linear, frequency doubled pulsed Nd:YAG laser beam 46. Beam 46 is directed at objective lens 48 and focused upon workpiece 50. Thus, by adjusting attenuators 36 and 42 the percentage of 532 nm and 1064 nm wavelengths in laser beam 46 can be adjusted and optimized for a particular workpiece 50. Apparatus 10 further includes video camera 52 mounted co-axially behind partially reflective dichroic mirror 53 to permit viewing workpiece 50 through lens 48. Illumination source 54 shines off mirror 53 towards workpiece 50 to facilitate visibility. In addition, mirror 22, housing 14, crystal 28 and output mirror 24 are secured to rail 55 by grail supports 56a, 56b, 56c and 56d, respectively.

Figure 2:
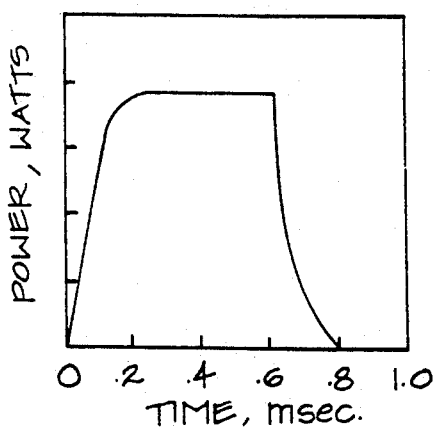
FIG. 2 is a power versus time graph showing the waveform of the pulsed laser beams in FIG. 1.

Referring now to FIG. 2, there is seen a power versus time graph for the waveform of laser beam 46. Suitable pulse times for microelectronic bonding are typically between 0.5 to 5.0 milliseconds, with 0.6 to 1.5 milliseconds preferred. Flashlamp 18 is turned on and off for each pulse. As a result, there is an exponential increase in power output until a maximum level is reached at 0.2 milliseconds and maintained until 0.6 milliseconds, at which point the power exponentially decreases to zero power at 0.8 milliseconds. With a pulsed laser the metals to be bonded are heated to a maximum temperature at which time the energy input exponentially decreases. The pulsed laser provides a higher power level at the middle of the pulse than a Q-switched laser. However, the peak power is orders of magnitude less than the spike at the beginning of a Q-switch pulse. This exponentially increasing power from the pulsed laser preheats the bond site and provides the bond site with the most power when it can use it most efficiently. It also provides decreasing power which tends to allow less internal stress buildup than the instantaneous drop-off of energy that is characteristic of a Q-switch or continuous-wave lasers. The pulsed Nd:YAG laser pulse width should also be short enough to allow bonding without damaging the surrounding integrated circuit.

Figure 3A:
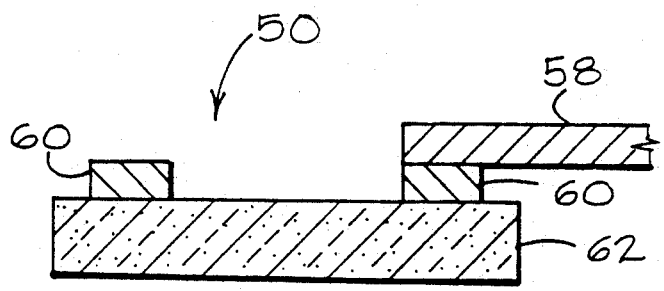
FIGS. 3A-3C are cross-sectional views of a workpiece being bonded by the apparatus in FIG. 1.

Referring now to FIGS. 3A–3D, cross-sectional views of workpiece 50 during a laser bonding operation of apparatus 10 are shown. As seen in FIG. 3A, workpiece 50 consists of the 1) inner end of a highly reflective gold plated copper tape-automated-bonding lead 58, 1.3 mils thick and 3 mils wide, and 2) a highly reflective gold bonding pad 60, 1 mil thick, 4.4 mils on each side and located on integrated circuit chip 62. Initially, lead 58 is aligned with and held in contact with pad 60. This can be done using a glass or quartz slide as disclosed in U.S. Pat. No. 4,978,835 to Luijtjes et al. Using a high magnification video microscope and a tape/chip fixture (not shown) enables precise alignment of the laser beam 46 with workpiece 50. At the ambient temperature, in this case room temperature, lead 58 and pad 60 have high absorption of energy from the 532 nm wavelength beam 30 but low absorption of energy from the 1064 nm wavelength beam 32. Preferably, high absorption is greater than or equal to 10 percent of the energy in the laser beam where the beam impinges upon the lead, whereas low absorption is less than 10 percent of the energy in the laser beam where beam impinges upon the lead.

Figure 3B:
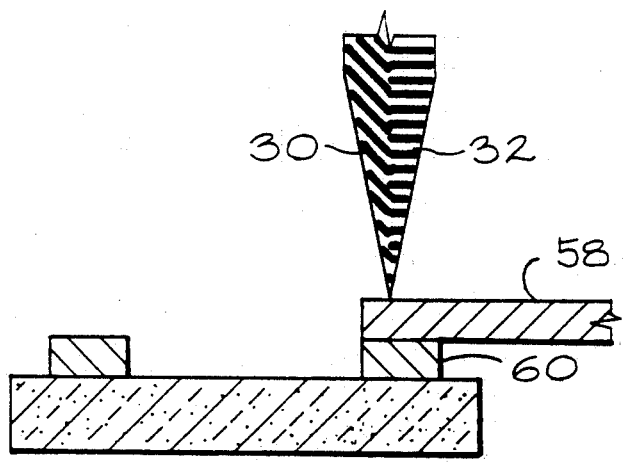

With reference now to FIG. 3B, laser beams 30 and 32 are directed at lead 58. Workpiece 50 impinged by a 1.75 millisecond, 75 millijoule pulse consisting of 25 millijoules of 532 nm beam 30 and 50 milljoules of 1064 nm beam 32. At least 3 millijoules of 532 nm beam 30 is necessary to adequately heat and diminish the reflectivity of lead 58. Initially, energy mainly from 532 nm beam 30 (and very little energy from 1064 nm beam 32) is absorbed by lead 58 and pad 60. As energy is absorbed from 532 nm beam 30, the temperature of lead 58 and pad 60 increases, the reflectivity of lead 58 and pad 60 decreases, and lead 58 and pad 60 become highly absorptive of the 1064 nm wavelength. Furthermore, lead 58 and pad 60 continue to be highly absorptive of energy from 532 nm beam 30.

Figure 3C:
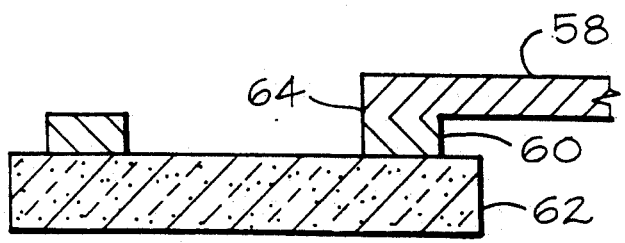

Referring now to FIG. 3C, lead 58 and pad 60, which now have high absorption of energy from the 1064 nm wavelength, absorb energy from 1064 nm beam 32 and further increase in temperature until they melt. The melt zone is well controlled and localized to within a 3 mil region. In addition, lead 58 and pad 60 are heated solely by beams 30 and 32, and essentially all of the absorbed laser energy is absorbed by lead 58 and pad 60 as opposed to the underlying chip 62. Thereafter, beams 30 and 32 are discontinued, lead 58 and pad 60 cool and a solid void-free copper/gold alloy bond 64 forms between lead 58 and pad 60. In particular, the absence of tin at bond 64 is highly advantageous since the subsequent formation of brittle tin intermetallics is eliminated.

Having bonded members 58 and 60, apparatus 10 can now perform additional bonding. Beam positioners (not shown) are actuated to direct beams 30 and 32 at a new lead and pad at a rate of 3 bonds per second. Since beams 30 and 32 exit cavity 12 at a 20 Hz repetition rate, it is necessary to operate shutter 33 at 3 Hz in order to synchronize beams 30 and 32 with the beam positioners.

In the remaining embodiments depicted in FIGS. 4–10, the various apparatus produce multiple laser beams which are not in frequency doubled relationship and are not simultaneously directed at the metal members. Unless otherwise specified, similarly numbered parts in the schematic representations of FIGS. 4–7 are the same as previously described and the descriptions shall not be repeated.

Referring now to FIG. 4, a schematic representation of another embodiment of the present invention is shown. Apparatus 66 includes first laser beam source 68 which generates a continuous-wave, multi-mode argon ion laser beam 70. One such source 68 can be obtained from Spectra-Physics, Inc. Other suitable first lasers include copper vapor lasers, continuous-wave helium green lasers, and other gas lasers, ion lasers, solid state lasers, and diode arrays. In any event, the first laser beam must have a shorter wavelength than the second laser beam, high absorption by the first member at the ambient temperature, and sufficient power (normally more than 1 watt) to heat the first member and render it highly absorptive to a second laser beam without destroying it. Returning to the example, argon ion laser source 68 directs argon ion laser beam 70 at electromechanical shutter 72 which is controllably open for a preset amount of time in the range of 5 to 100 milliseconds. The shutter on-time (dwell time) can be programmed either from front panel controls or a computer. The argon ion laser beam 70 output from shutter 72 has several wavelengths with the most intensity at the 488 nm (blue) and 515 nm (green) wavelengths. Argon ion laser beam 70 is next directed to beam expander 73 which expands beam 70 by a factor of 5 (i.e., the emerging essentially parallel laser beam diameter is increased to 5 times the beam's original non-parallel diameter). Preferably, the beam expander magnification in expander 73 is variable to accommodate different optics. The expanded argon ion laser beam 70 with a 10 millimeter diameter is directed to partially reflecting mirror 38 and reflected toward dichroic mirror 40. Argon ion laser beam 70 passes through dichroic mirror 40 to objective lens 48 and is focused upon workpiece 50. Apparatus 66 also includes second laser beam YAG source 74 which generates a pulsed, multi-mode 1064 nm wavelength Nd:YAG laser beam 76. Source 74 may be identical to YAG cavity 12 without frequency doubling crystal 28. Laser beam 76 is directed at beam expander 78 and expanded by a factor of 8. Beam 76 with a 10 millimeter diameter (which need not be the same diameter as beam 70) strikes dichroic mirror 40 and reflects toward lens 48 in co-linear relationship with argon ion laser beam 70. Like beam 70, beam 76 is focused by lens 48 on workpiece 50 and viewed by video camera 52.

Figure 5:
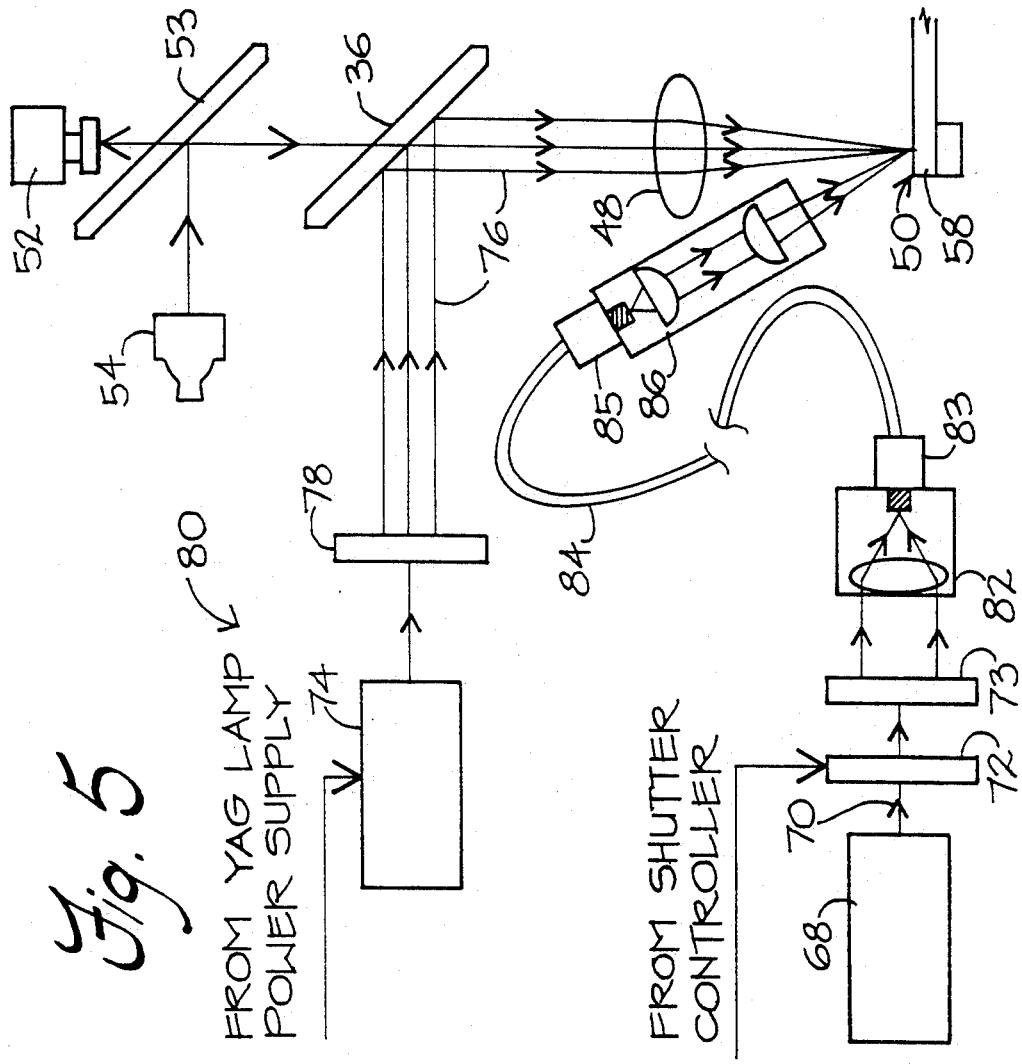

With reference now to FIG. 5, another schematic representation of the present invention is shown. In this embodiment, the first laser beam is brought into focus on the workpiece in the same area as the second laser beam by means of an optical fiber and, thus, the beams are not co-axial. Fiber optic beam delivery systems for lasers are well known in the art. See, for instance, U.S. Pat. Nos. 4,564,736; 4,676,586; 4,681,396 and 5,026,979. As may be seen, apparatus 80 includes YAG source 74, beam expander 78, dichroic mirror 40 and lens 48 for directing second beam 76 at lead 58, video camera 52 and illumination source 54 for viewing workpiece 50, and argon ion laser source 68 for directing first beam 70 through shutter 72 and expander 73, all of which has been previously described. However, as not previously described, the expanded argon ion laser beam 70 is directed at fiber coupling lens housing 82 and focused upon fiber optical cable 84. Optical cable 84 may be a 50 micron diameter single fiber made of fused silica core. Preferably, the ends of cable 84 are cut perpendicular to the axis of the fiber, polished, and terminated in standard terminations such as SMA connectors 83 and 85. Such connectors form mechanical interfaces to fiber coupling lens housing 82 and fiber beam delivery optic 86. Thus, argon ion laser beam 70 travels through cable 84 to delivery optic 86 positioned at the focal plane of lens 48. Optic 86 focuses argon ion laser beam 70 upon lead 58. After objective lens 48 is fixed with respect to workpiece 50, delivery optic 86 is positioned to a working distance of 15 millimeters. The focal length of delivery optic 86 may be adjustable. Furthermore, the angle of incidence of delivery optic 86 is 30° but should be as close to normal as possible. Thus, delivery optic 86 can be mechanically positioned relative to the objective lens axis in terms of angle and working distance. In addition, although not shown, a laser beam catcher such as a Wood's horn may be employed to prevent portions of argon ion laser beam 70 which reflect off workpiece 50 from possibly damaging sensitive nearby materials such as polyimide tape.

Figure 6:
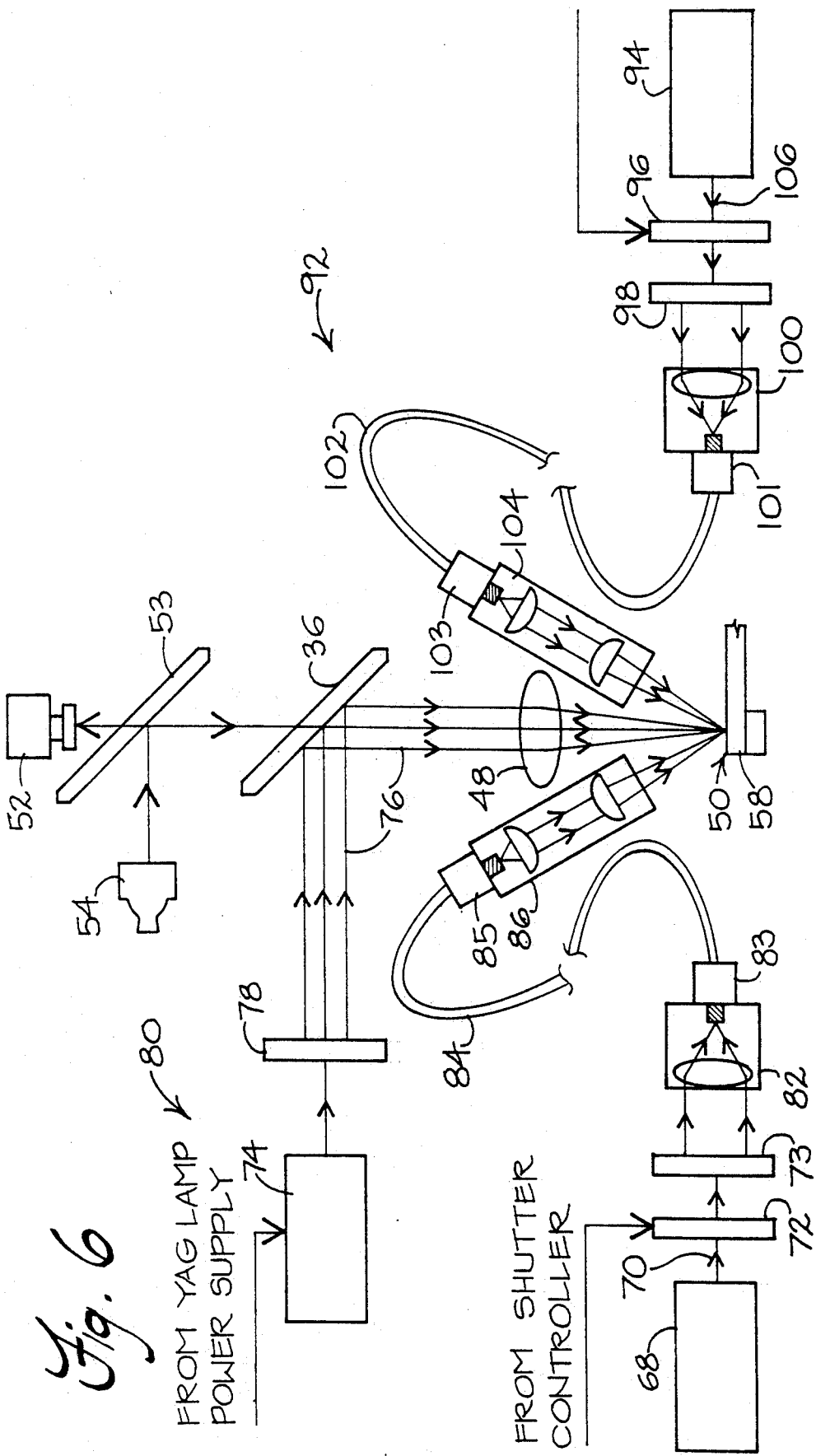

Referring now to FIG. 6, another embodiment of the present invention is shown which is identical to the embodiment in FIG. 5 except that apparatus 92 employs multiple (instead of a single) fiber beam delivery optics to increase the power density from several low power first laser beams such as air cooled argon ion lasers. It should be noted that the rate a laser beam heats a workpiece is a function of not only the thermal properties of the workpiece but also the radiant power density of the focused laser beam which impinges on the workpiece. The radiant power density can be increased by bringing to the same area several focused laser beams. Furthermore, projected advances in semiconductor lasers (laser diodes) at wavelengths below 600 nm with low output powers (less than 0.5 watts) make such multiple optic delivery systems appear promising. As may be seen, second argon ion laser source 94, shutter 96, expander 98, lens housing 100, cable 102, connectors 101, 103 and delivery optic 104 are identical to source 68, shutter 72, expander 73, lens housing 82, cable 84, connectors 83, 85 and delivery optic 86, respectively. Delivery optic 104 is positioned opposite delivery optic 86. As a result, an argon ion laser beam 106 which is identical to beam 70 is focused on lead 58 and used in conjunction with beam 70 to function as the first laser beam. Of course more than two delivery optics can be used. Likewise, second laser beam 76 may consist of two or more YAG laser beams.

Figure 7:
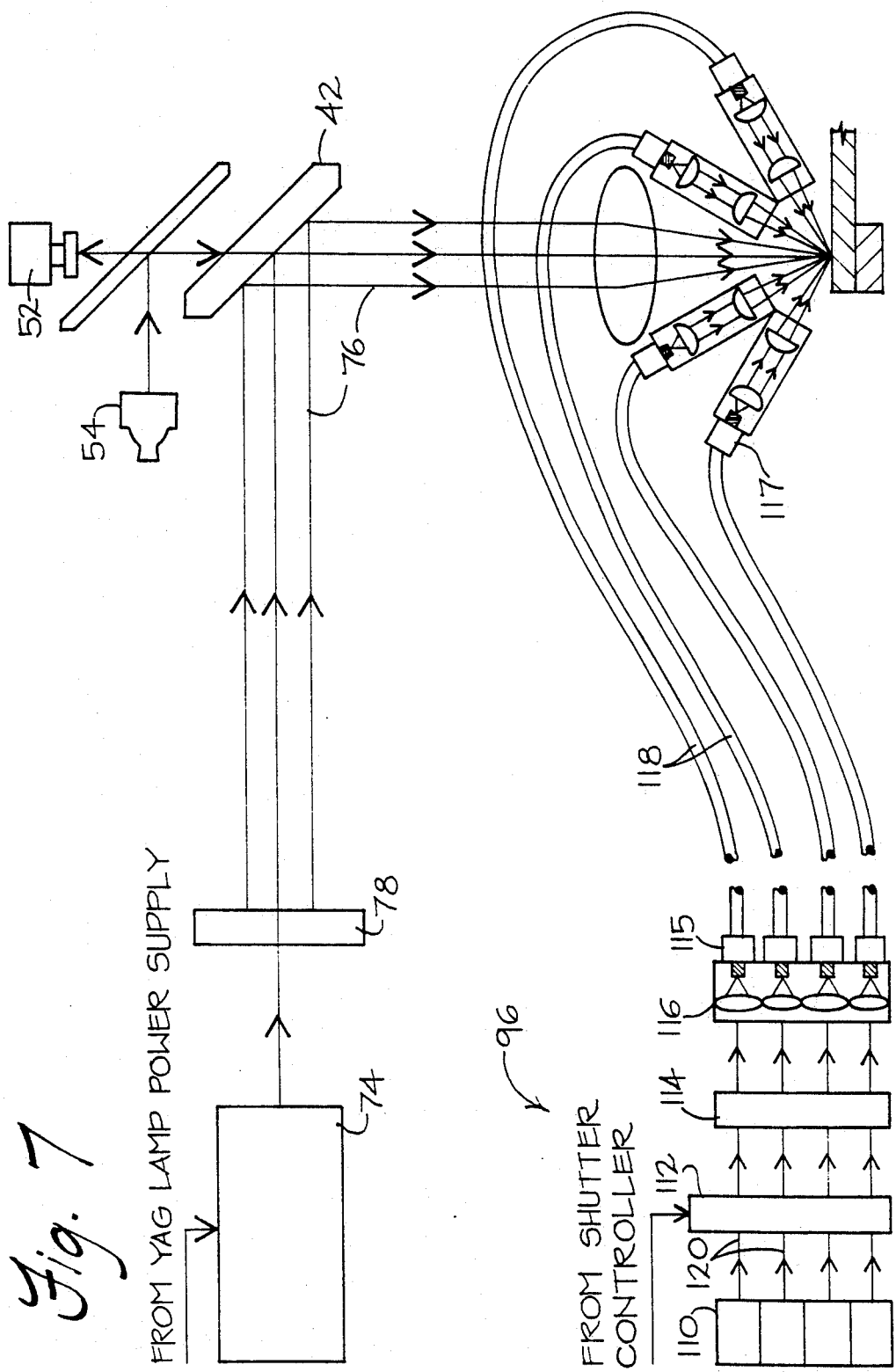

With reference now to FIG. 7, a further embodiment of the present invention is shown which is identical to the embodiment in FIG. 6 except that apparatus 96 replaces argon ion laser source 68, shutter 72 expander 73, lens housing 82, connectors 83, 85 and cable 84 with a plurality of visible semiconductor laser diodes 110, large aperture shutter 112, astigmatism correction lens array 114, fiber coupling lens array housing 116, connectors 115, 117 and a plurality of optical cables 118, respectively. As a result, argon ion laser beam 70 is replaced by diode laser beam 120. Obviously, several beams 120 can be generated and used as the first laser beam in accordance with the previously described multiple fiber optic delivery system.

Figure 8:
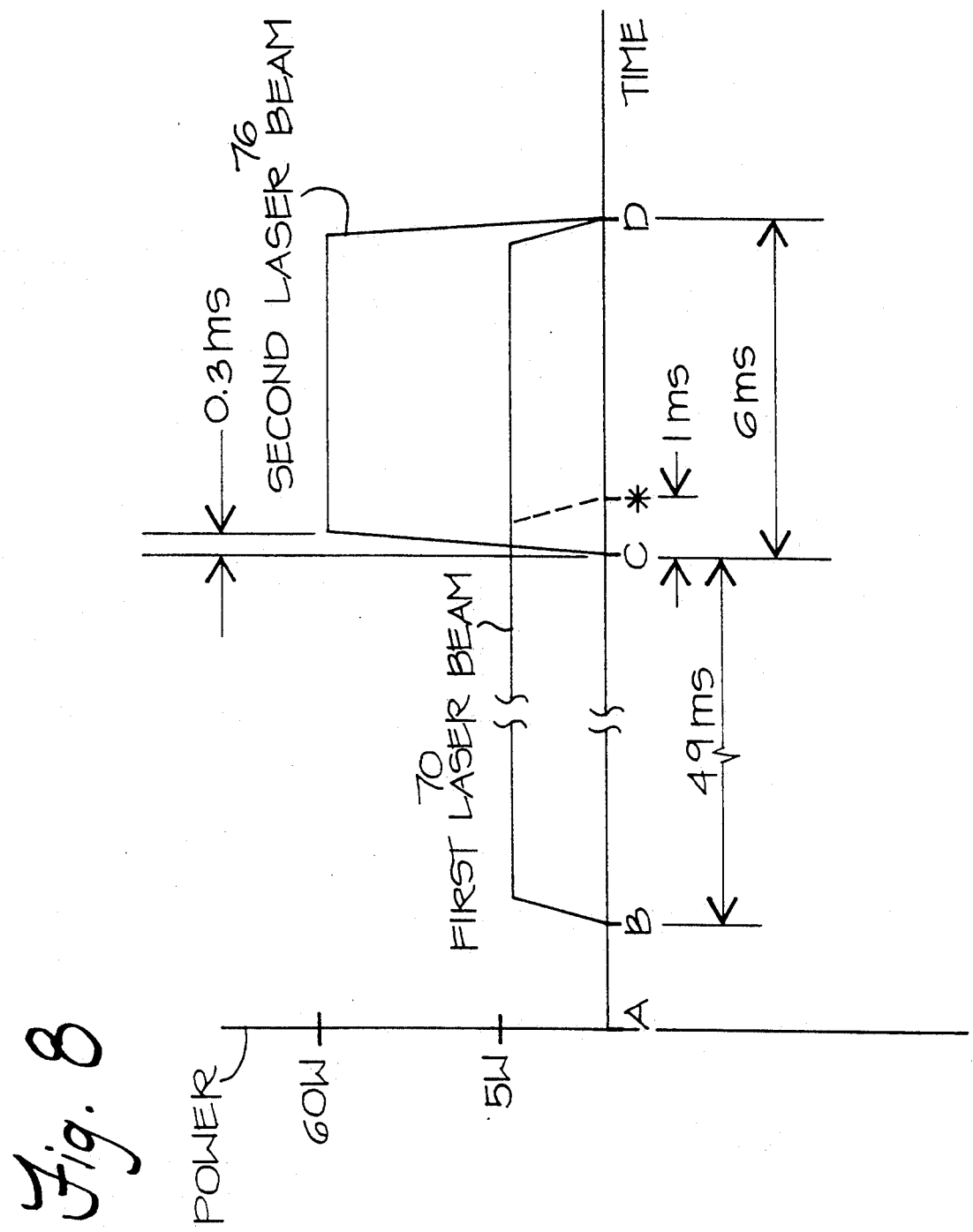
FIG. 8 is a power versus time graph showing the waveforms of the pulsed laser beams in FIGS. 4-7.
Figure 9:
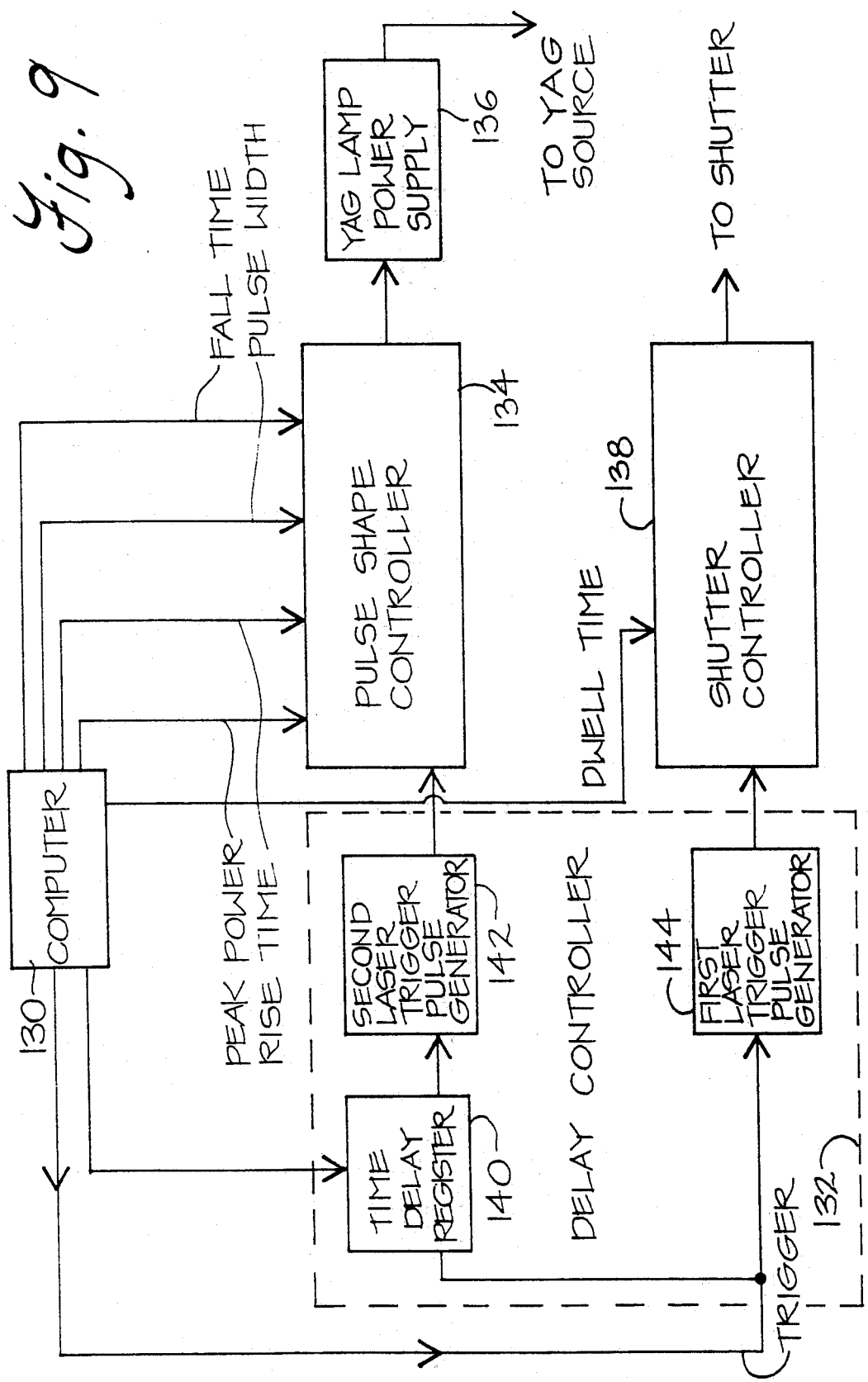
FIG. 9 is a schematic representation of control circuitry used for FIGS. 4-7.

Referring now to FIGS. 8, 9 and 10A-10D, unless otherwise specified the power versus time graph in FIG. 8, the control circuitry in FIG. 9, and the bonding operation in FIGS. 10A-10D apply to FIGS. 4-7. For illustration purposes, FIGS. 8, 9 and 10A-10D shall be described in conjunction with FIG. 4.

With reference now to FIG. 8, a power versus time curve is shown for the first and second laser beams. As may be seen, at time "A" the laser beams are dormant. At time "B" first beam 70 is activated and rapidly reaches 5 watts peak power. At time "C", 49 milliseconds after time "B", second laser beam 76 is activated and in 0.3 milliseconds ramps-up to 60 watts peak power. Between time "C" and time "D", lead 58 melts. Finally, at time "D", 6 milliseconds after time "C", both laser beams are discontinued and members 58 and 60 solidify to form bond 64 therebetween. In other words, solely first beam 70 impinges lead 58 for 49 milliseconds and renders it highly absorptive to energy from second beam 76. Immediately thereafter, for 6 milliseconds the first and second laser beams both impinge upon lead 58 which becomes molten. Then the beams are discontinued. As a result, bonding is accomplished in 55 milliseconds even though the beams are sequentially triggered with reduced overlap. Furthermore, first beam 70 may be turned off or discontinued before turning off second beam 76. This may even occur shortly after activating second beam 76. For instance, as shown by the broken lines at time "*", beam 70 is discontinued 1 millisecond after second beam 76 is activated at time "C".

Referring now to FIG. 9, apparatus 66 further includes laser control circuitry shown as HP9000 computer 130, delay controller 132, pulse shape controller 134, YAG lamp power supply 136 and shutter controller 138. Delay controller 132 further includes time delay register 140, second laser trigger pulse generator 142 and first laser trigger pulse generator 144. The control circuitry determines the second laser beam's pulse shape, rise time, peak power, pulse width and fall time. For beam 76, typically the rise time is between 0.2 to 1.0 milliseconds, the pulse duration (90% of peak power point) is between 3 to 10 milliseconds, and the peak pulse power is between 40 to 80 watts. The control circuitry also determines the pulse width of first beam 70.

Figure 10A:
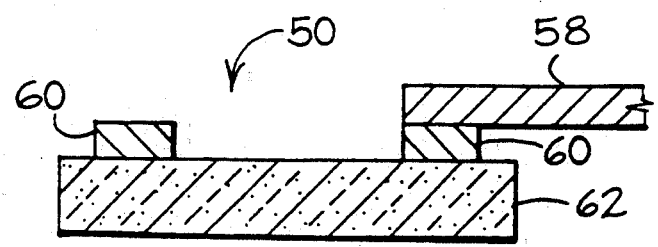
FIGS. 10A-10D are cross-sectional views of a workpiece being bonded by the various apparatus in FIGS. 4-7.
Figure 10B:
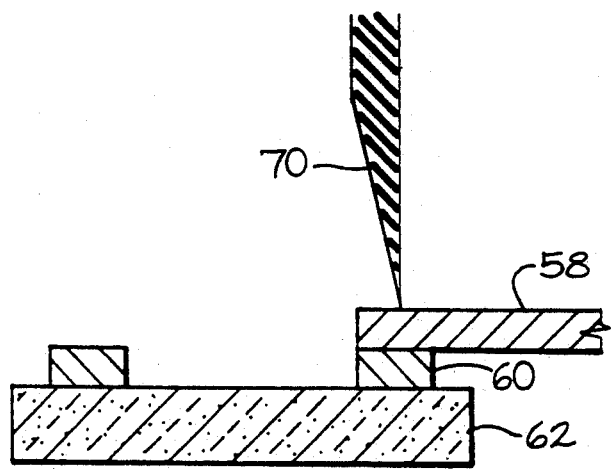
Figure 10C:
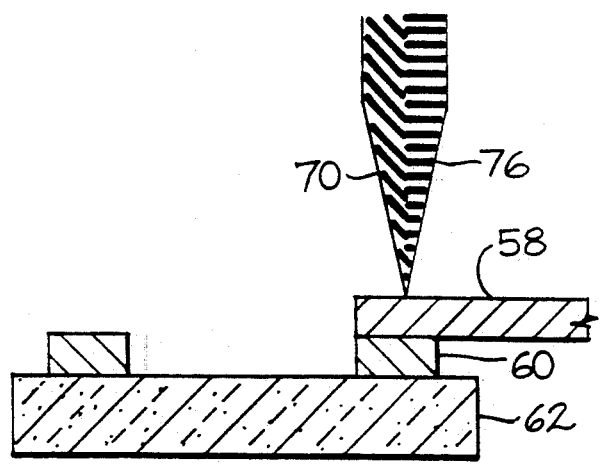
Figure 10D:
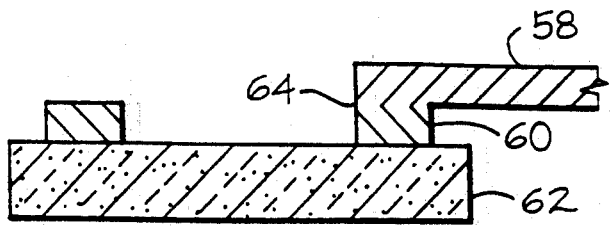

Referring now to FIGS. 10A-10D, in FIG. 10A, prior to time "A", computer 130 sends out the initial bonding parameters. Computer 130 sends the delay time between the laser beams 70 and 76 to delay controller 132, the peak power, rise time, pulse width and fall time for second laser beam 76 to pulse shape controller 134, and the dwell time for first beam 70 to shutter controller 138. Since pulse shape controller 134 turns off YAG lamp power supply 136 and shutter controller 138 closes shutter 72, no laser beam is directed at lead 58. In FIG. 10B, at time "B", computer 130 triggers pulse generator 144 which instructs shutter controller 138 to open shutter 72. As a result, first laser beam 70 impinges upon and begins to heat lead 58. In FIG. 10C, at time "C", 49 milliseconds later, time delay register 140 signals pulse generator 142 to command pulse shape controller 134 to turn on power supply 136. Power supply 136 then activates second laser source 74. As a result, lead 58 absorbs energy from second laser beam 76, further increases in temperature, and melts. In FIG. 10D, at time "D", the dwell time expires and shutter controller 138 commands shutter 72 to close. Likewise, the pulse width expires and pulse shape controller 134 commands power supply 136 to shut off. As a result, the first and second laser beams are discontinued and the molten metal form bond 64.

As should be clear to one having skill in the art, many other lasers and optical configurations can be designed to accomplish the teachings of the present invention. In addition, the method of the present invention for using multiple laser beams to bond metal members is apparent from the foregoing description.

The present invention, therefore, is well adapted to carry out the objects and attain the ends and advantages mentioned, as well as others inherent therein. While presently preferred embodiments of the invention have been described for the purpose of disclosure, numerous changes in the steps of the process and the parts of the apparatus will be readily apparent to those skilled in the art, and are encompassed within the spirit of the present invention and the scope of the appended claims.

What is claimed is:

1. A method of using multiple laser beams to bond metal members, comprising:

generating a first laser beam;

generating a second laser beam with a longer wavelength than the first laser beam;

contacting first and second metal members wherein at an ambient temperature the first member has high absorption of energy from the first laser beam but low absorption of energy from the second laser beam;

directing the first laser beam at the first member at the ambient temperature wherein the first member absorbs energy from the first laser beam, the temperature of the first member increases and the reflectivity of the first member decreases so that the first member has high absorption of energy from the second laser beam;

directing the second laser beam at the first member while the first member has high absorption of energy from the second laser beam so that the first member absorbs energy from the second laser beam, the temperature of the first member further increases and a member melts; and discontinuing to direct the laser beams at the first member, thereby cooling the molten member and forming a solid bond between the members.

2. The method of claim 1, wherein high absorption is greater than or equal to 10 percent of the energy in the laser beam where the laser beam impinges upon the first member, and low absorption is less than 10 percent of the energy in the laser beam where the laser beam impinges upon the first member.

3. The method of claim 1, wherein the bond is pure gold.

4. The method of claim 1, wherein the bond consists of an alloy of the members.

5. The method of claim 4, wherein the alloy contains no tin.

6. The method of claim 4, wherein the alloy comprises gold.

7. The method of claim 6, wherein the alloy is a copper/gold alloy.

8. The method of claim 1, wherein the first member is heated above the ambient temperature solely by absorbed energy from the laser beams.

9. The method of claim 8, wherein essentially all of the absorbed energy is absorbed by the members.

10. The method of claim 8, wherein essentially all of the absorbed energy is absorbed by the first member.

11. The method of claim 1, wherein the first member melts.

12. The method of claim 11, wherein both members melt.

13. The method of claim 12, wherein
at the ambient temperature the second member has high absorption of energy from the first laser beam but low absorption of energy from the second laser beam,
the second member absorbs energy from the first laser, the temperature of the second member increases and the reflectivity of the second member decreases so that the second member has high absorption of the second laser beam,
the second member absorbs energy from the second laser beam while the second member has high absorption of energy from the second laser beam and the temperature of the second member further increases, and
both members melt.

14. The method of claim 1, wherein the laser beams are co-linear.

15. The method of claim 1, wherein the laser beams are not co-linear.

16. The method of claim 1, wherein the first laser beam is directed at the first member before the second laser beam is directed at the first member.

17. The method of claim 16, wherein the second laser beam is directed at the first member after the first member has high absorption of energy from the second laser beam.

18. The method of claim 1, wherein the laser beams are directed at the first member simultaneously.

19. The method of claim 1, wherein the first laser beam is visible and the second laser beam is infrared.

20. The method of claim 1, wherein the first laser beam has a wavelength between 300-600 nm and the second laser beam has a wavelength between 600-1200 nm.

21. The method of claim 20, wherein the first laser beam has a 532 nm wavelength and the second laser beam has a 1064 nm wavelength.

22. The method of claim 1, wherein the laser beams are pulsed laser beams.

23. The method of claim 1, wherein the laser beams are not Q-switched laser beams.

24. The method of claim 1, wherein the first laser beam is an argon ion laser beam.

25. The method of claim 1, wherein the second laser beam is an Nd:YAG laser beam.

26. The method of claim 1, wherein the first laser beam consists of a plurality of seperate beams.

27. The method of claim 1, wherein the first laser beam is directed through a fiber optical cable.

28. The method of claim 1, wherein the ambient temperature is at room temperature.

29. The method of claim 1 wherein the first member comprises copper or gold.

30. The method of claim 1, wherein at the ambient temperature the first member is highly reflective.

31. The method of claim 1, wherein at the ambient temperature the members are highly reflective, the first laser beam is visible and the second laser beam is infrared.

32. The method of claim 1, wherein the first member is the inner end of a tape-automated-bonding lead and the second member is a bonding pad on an integrated circuit chip.

33. The method of claim 30, wherein the tape-automated-bonding lead is gold plated copper and bonding pad is gold.

34. A method of using multiple laser beams to bond metal members, comprising:
generating a first pulsed laser beam;
generating a second pulsed laser beam with a longer wavelength than the first laser beam;
contacting first and second metal members wherein at an ambient temperature the first member has high absorption of energy from the first laser beam but low absorption of energy from the second laser beam, and wherein high absorption is greater than or equal to 10 percent of the energy in the laser beam where the laser beam impinges upon the first member and low absorption is less than 10 percent of the energy in the laser beam where the laser beam impinges upon the first member;
directing the first laser beam at the first member at the ambient temperature wherein the first member absorbs energy from the first laser beam, the temperature of the first member increases and the reflectivity of the first member decreases so that the first member has high absorption of energy from the second laser beam;
directing the second laser beam at the first member while the first member has high absorption of energy from the second laser beam so that the first member absorbs energy from the second laser beam, the temperature of the first member further increases and both of the members melt; and
discontinuing to direct the laser beams at the first member, thereby cooling the members and forming a solid bond between the members.

35. The method of claim 34, wherein the bond is pure gold.

36. The method of claim 34, wherein
at the ambient temperature the second member has high absorption of energy from the first laser beam but low absorption of energy from the second laser beam,
the second member absorbs energy from the first laser, the temperature of the second member increases and the reflectivity of the second member decreases so that the second member has high absorption of the second laser beam, and the second member absorbs energy from the second laser beam while the second member has high absorption of energy from the second laser beam and the temperature of the second member further increases.

37. The method of claim 34, wherein the first laser beam is directed at the first member before the second laser beam is directed at the first member.

38. The method of claim 34, wherein the members are highly reflective, the first laser beam is visible and the second laser beam is infrared.

39. The method of claim 34, wherein the second laser beam is an Nd:YAG laser beam.

40. The method of claim 34, wherein the first member is the inner end of a gold plated copper tape-automated-bonding lead and the second member is a gold bonding pad on an integrated circuit chip.

41. The method of claim 34, further comprising generating the first and second laser beams as a co-linear laser beam, separating the first and second laser beams from the co-linear laser beam, attenuating the separated first laser beam, attenuating the separated second laser beam, combining the attenuated first and second laser beams into a composition altered co-linear beam, and directing the composition altered co-linear laser beam at the first member, thereby allowing the percentage of the first and second laser beams which impinge upon the first member to be adjusted.

42. An apparatus with multiple laser beams for bonding metal members, which comprises:

means for generating a first laser beam;

means for generating a second laser beam with a longer wavelength than the first laser beam;

a first metal member wherein at an ambient temperature the first member has high absorption of energy from the first laser beam but low absorption of energy from the second laser beam;

a second metal member;

means for holding the first and second members in contact with one another;

means for directing the first laser beam at the first member at the ambient temperature wherein the first member absorbs energy from the first laser beam, the temperature of the first member increases and the reflectivity of the first member decreases so that the first member has high absorption of energy from the second laser beam without roughening the surface of the first member;

means for directing the second laser beam at the first member while the first member has high absorption of energy from the second laser beam so that the first member absorbs energy from the second laser beam, the temperature of the first member further increases and a member melts; and means for discontinuing to direct the laser beams at the first member so that the molten member cools and a solid bond forms between the members.

43. An apparatus with multiple laser beams for bonding metal members, which comprises:

means for generating a first pulsed laser beam;

means for generating a second pulsed laser beam with a longer wavelength than the first laser beam;

a first metal member wherein at an ambient temperature the first member has high absorption of energy from the first laser beam but low absorption of energy from the second laser beam, and wherein high absorption is greater than or equal to 10 percent of the energy in the laser beam where the laser beam impinges upon the first member and low absorption is less than 10 percent of the energy in the laser beam where the laser beam impinges upon the first member;

a second metal member;

means for holding the first and second members in contact with one another;

means for directing the first laser beam at the first member at the ambient temperature wherein the first member absorbs energy from the first laser beam, the temperature of the first member increase and the reflectivity of the first member decreases so that the first member has high absorption of energy from the second laser beam without roughening the surface of the first member;

means for directing the second laser beam at the first member while the first member has high absorption of energy from the second laser beam due to said temperature increase in the first member caused by energy from the first laser beam so that the first member absorbs energy from the second laser beam, the temperature of the first member further increases and both members melt; and means for discontinuing to direct the laser beams at the first member so that the members cool and a solid bond forms between the members.

44. The system of claim 43, wherein the first laser beam is directed at the first member before the second laser beam is directed at the first member.

45. The apparatus of claim 43, wherein the first laser beam has a wavelength between 300-600 nm and the second laser beam has a wavelength between 600-1200 nm.

46. The apparatus of claim 43, wherein the first laser beam is visible and the second laser beam is infrared.

47. The apparatus of claim 43, wherein the second laser beam is an Nd:YAG laser beam.

48. The apparatus of claim 43, further comprising:

means for generating the first and second laser beams as a co-linear laser beam, means for separating the first and second laser beams from the co-linear laser beam, means for attenuating the separated first laser beam, means for attenuating the separated second laser beam, means for combining the attenuated first and second laser beams into a composition altered co-linear beam, and means for directing the composition altered laser beam at the first member, thereby allowing the percentage of the first and second laser beams which impinge upon the first member to be adjusted.

49. The apparatus of claim 48, wherein the means for separating the first and second laser beams is a first dichroic mirror, and the means for combining the attenuated first and second laser beams is a second dichroic mirror.

50. The apparatus of claim 43, wherein the laser beams are simultaneously directed at the first member while the first member has high absorption of energy from the second laser beam.

51. The apparatus of claim 43, wherein the first laser beam fails to melt the first member.

* * * * *